(12) United States Patent
Kaltschmidt et al.

(10) Patent No.: US 7,414,566 B2
(45) Date of Patent: Aug. 19, 2008

(54) SYSTEM FOR MONITORING AIRPORT AREA

(75) Inventors: Horst Kaltschmidt, Neubiberg (DE); Helmut Klausing, Hochstadt (DE)

(73) Assignee: EADS Deutschland GmbH, Ottobrunn (DE)

( * ) Notice: Subject to any disclaimer, the term of this patent is extended or adjusted under 35 U.S.C. 154(b) by 209 days.

(21) Appl. No.: 10/542,567

(22) PCT Filed: Feb. 12, 2004

(86) PCT No.: PCT/DE2004/000249

§ 371 (c)(1),
(2), (4) Date: Jul. 18, 2005

(87) PCT Pub. No.: WO2004/075139

PCT Pub. Date: Sep. 2, 2004

(65) Prior Publication Data

US 2006/0145913 A1    Jul. 6, 2006

(30) Foreign Application Priority Data

Feb. 19, 2003  (DE) ............................... 103 06 922

(51) Int. Cl.
*G01S 13/90* (2006.01)
*G01S 13/93* (2006.01)
(52) U.S. Cl. .................. 342/29; 342/123; 342/25 A; 342/53; 342/57; 342/38; 342/158; 342/179
(58) Field of Classification Search ............ 342/29
See application file for complete search history.

(56) References Cited

U.S. PATENT DOCUMENTS 5,093,649 A * 3/1992 Johnson ..................... 342/157

(Continued)

FOREIGN PATENT DOCUMENTS

DE    101 20 536 A1    11/2002

(Continued)

OTHER PUBLICATIONS

Monzel F G et al "Surface Movement Guidance and Control System" Electrical Communication, Alcatel, Brussels, BE 1993, pp. 51-59 (SR).

(Continued)

*Primary Examiner*—Thomas H. Tarcza
*Assistant Examiner*—Matthew M Barker
(74) *Attorney, Agent, or Firm*—Collard & Roe, P.C.

(57) ABSTRACT

A system is for recognizing obstructions and monitoring movements on or above an airport area (1) with sensors (2, 3, 4). A sensor (2) is a radar device having a plurality of antenna elements (12, 14), which are affixed to a curved surface (15) of an antenna carrier (2*a*) and are turned on, one after the other, in terms of time. Thus a first part of the antenna elements (14) is disposed on a first circular line (13) on the surface of the antenna carrier (2*a*), and a second part of the antenna elements (12) is disposed on a circular line (15) perpendicular to the first circular line (13). Therefore the data of the radar device (2) are evaluated in a first ROSAR process, to image the situation on the ground, and in a second ROSAR process, to image the heights of the flying objects to be observed.

13 Claims, 2 Drawing Sheets

U.S. PATENT DOCUMENTS

| | | |
|---|---|---|
| 6,282,488 B1 | 8/2001 | Castor et al. |
| 6,965,342 B2 * | 11/2005 | Klausing et al. .............. 342/52 |
| 7,023,375 B2 * | 4/2006 | Klausing et al. .......... 342/25 A |
| 2002/0135505 A1 | 9/2002 | Klausing et al. |

FOREIGN PATENT DOCUMENTS

| | | |
|---|---|---|
| DE | 101 20 537 A1 | 11/2002 |
| FR | 2 841 387 A | 12/2003 |
| WO | WO 01/23907 | 4/2001 |

OTHER PUBLICATIONS

Klausing H et al: "Feasibility of a synthetic aperture radar with rotating antennas (ROSAR)"IEEE International Radar Conference, May 7, 1990, pp. 51-56 (SR).

* cited by examiner

SYSTEM FOR MONITORING AIRPORT AREA

CROSS REFERENCE TO RELATED APPLICATIONS

Applicant claims priority under 35 U.S.C. §119 of German Application No. 103 06 922.4 filed Feb. 19, 2003. Applicant also claims priority under 35 U.S.C. §365 of PCT/DE2004/000249 filed Feb. 12, 2004. The international application under PCT article 21(2) was not published in English.

BACKGROUND OF THE INVENTION

1. Field of the Invention

The invention relates to a system for monitoring an airport area, in accordance with the preamble of claim 1.

2. The Prior Art

Traffic management on the take-off and landing strip, the taxiing area and the apron, as well as of the flight traffic in the immediate vicinity of the airport, presupposes high-resolution, all-weather-capable detection of all traffic participants, particularly aircraft, persons, and objects, e.g. lost luggage, aircraft parts or vehicle parts.

U.S. Pat. No. 6,282,488 B1 describes a system for monitoring the movements on and above an airport area, as well as for monitoring arriving and departing aircraft. In this connection, monitoring of movements on the ground takes place by means of ground radar devices. Monitoring of arriving and departing aircraft takes place by means of additional radar devices. A disadvantage in this connection is that because of the large number of data devices required, a large data volume has to be processed.

SUMMARY OF THE INVENTION

It is the task of the invention to create an imaging, all-weather-capable system consisting of several sensors for monitoring the movements on and above an airport area, in which radar devices are used that have a low sensitivity to ground clutter and which, at the same time, monitor the air space and the ground region of the airport area.

This task is accomplished with the system according to claim 1. Advantageous embodiments of the invention are the object of dependent claims.

According to the invention, a sensor is a radar device having a plurality of antenna elements, which are affixed to a curved surface of an antenna carrier and are turned on, one after the other, in terms of time, whereby a first part of the antenna elements is disposed on a first circular line on the surface of the antenna carrier, and a second part of the antenna elements is disposed on a circular line perpendicular to the first circular line, and whereby the data of the radar device are evaluated in a first ROSAR process, to image the situation on the ground, and in a second ROSAR process, to image the heights of the flying objects to be observed.

In the following, the ROSAR principle will be briefly explained. Radar systems having a synthetic aperture (SAR =synthetic aperture radar), as used in aircraft or satellites, are designed for a straight-line movement of the antenna. SAR systems yield high-resolution images perpendicular to the movement direction, i.e. the antennas look sideways in the movement direction, in order to produce a large aperture. It is known from U.S. 2002/0135505 A1 and WO 01/23907 that in ROSAR (ROSAR=rotating synthetic aperture radar), the rotation of an antenna is used to produce the synthetic aperture. Scanning of the strip of area from various viewing angles is achieved by means of the rotation of the antenna, without any translational movement component of the carrier platform being required, as is the case, in contrast, for SAR. The rotation provides an all-around view, i.e. the ROSAR can cover an angle range of 360°.

In the case of the sensor according to the invention, the rotational movement of the antenna is simulated, i.e. the rotational movement is not carried out in reality, as in the known ROSAR process, but only virtually. The antenna elements disposed on a resting antenna carrier, according to the invention, are turned on, one after the other, in terms of time, with transmission signals, and the reflected reception signals are scanned one after the other, in terms of time. The temporally consecutive control of the resting antenna elements makes it possible to evaluate the data of the individual antenna elements according o the known ROSAR process. Aside from the high-resolution all-weather view, the other advantage achieved is the 360° all-around view that is a particular feature of the ROSAR process. Furthermore, a radar device whose data can be evaluated according to the ROSAR process is understood to be a radar device whose antenna elements are turned on and scanned one after the other, in terms of time.

An advantage of this system component is that the speed of the virtual antenna rotational movement can be selected in any way desired. This results in additional advantages with regard to low positioning errors of detected stationary or moving objects.

Therefore it is possible, using the system component according to the invention, to guarantee monitoring of the airport area in the ground region by means of the antenna elements disposed in a first horizontal plane, and the air space of the airport by means of the antenna elements disposed in the plane perpendicular to it. Furthermore, it is possible, using the system component according to the invention, to determine the flight heights of arriving or departing flying bodies.

An advantage in this connection is that the system component according to the invention can be implemented very easily, and without using a large surface area, as cannot be circumvented using radar devices having a real aperture and equally good resolution. Critical wind loads, which must be countered with heavy constructions, do not occur here. Monitoring of the ground region and the air space of the airport can therefore be combined in one system component. Because of the great height resolution of the system according to the invention, the requirement of secondary radar transponders in the flying bodies to be observed is eliminated, as compared with known systems. A secondary radar required on the ground can also be eliminated. A possible area of application of the system according to the invention lies, for example, in the military sector, for monitoring non-cooperative targets.

Another advantage is that the system component according to the invention can be used in mobile manner and therefore can also be positioned on take-off and landing strips within a short period of time.

In the monitoring of a large airport area, the invention is not limited to the use of a single system component according to the invention. As a function of shadow effects that occur due to larger buildings, for example, several system components according to the invention can be used, of course. It is practical, in another advantageous embodiment of the invention, that additional imaging sensors, particularly in the visible or infrared wavelength range, are used.

Using the system according to the invention, it is therefore possible to detect all of the traffic participants as well as objects in the airport area, with high resolution.

It is practical if an additional system component is a known ROSAR radar device. In the case of ROSAR, it is known that the rotation of the antenna affixed at the tip of the rotor is used to produce a synthetic aperture. Scanning of the strip of area from various viewing angles, which is required for high-resolution image production, is achieved by means of the rotation of the antenna. The rotation assures an all-around view, i.e. an angle range of 360° can be detected with a ROSAR radar device.

It is advantageous that other system components can also be used, whose data are evaluated according to a ROSAR process.

It is advantageous if the data of the system components that are evaluated according to the ROSAR process are passed to a first data processing unit having iconic image processing. Moving or stationary objects can be recognized and classified from the image data. In the case of iconic image processing, intensity values, also referred to as grayscale values, are assigned to each pixel. In iconic image processing, object recognition takes place by means of a comparison of images, for example by means of correlation of the object to be recognized with the image signal of the entire image.

It is advantageous if another data processing unit using symbolic image processing is present, to which the data of the first data processing unit and the data of the imaging sensors are passed. In the case of symbolic image processing, so-called image primitives, e.g. lines, edges, or rounded regions are recognized in the image data. Predeterminable symbols are assigned to these image primitives. For example, a tank can be defined by means of four coherent lines with rounded regions. Of course the image data can already have been processed by means of iconic image processing.

It is practical if track recognition processes and track following processes are taken into consideration in the iconic and/or symbolic image processing.

The result of the symbolic image processing is the representation of the current situation in all partial areas of the airport. It is advantageous if these image data, which are produced in the second image processing unit, are made visible on a display. Furthermore, it is advantageously possible to pass the data to a communications unit, from which the data are transmitted by radio to the airport monitoring and/or other communications participants, e.g. vehicles or aircraft. Transmission of the data preferably takes place using communications means already present at the airport. Data that come from other sources, e.g. pilot radio, can also be used by way of the communications devices, to improve the recognition of the current situation.

Preferably, the current danger situation, e.g. vehicle or aircraft collisions, can be analyzed by means of the image data produced. It is practical if necessary actions for preventing an analyzed risk are output automatically.

The position determination of the system components advantageously takes place by means of the Global Positioning System (GPS). It is practical if the differential GPS is used in this connection, in order to achieve greater positioning accuracy. It is advantageous to use a mobile communications network based on GSM to transmit the data between the sensors and the data processing units. It is practical, in this connection, if all of the requirements of signal-technology security are met, in order to avoid failures. In particular, it is practical to design communications networks in redundant manner, in order to guarantee greater availability. The use of mobile communications allows communication on both sides, i.e. full duplex communication and group communication.

If complete independence of the system according to the invention from the infrastructure of an airport is required, e.g. in the case of military deployments in a non-cooperative environment, data transmission can take place by means of HF/VHF data links. Of course, data transmission by way of a satellite connection is also possible.

Of course, transmission of the data can also take place by means of cable, e.g. fiber optic cable.

BRIEF DESCRIPTION OF THE DRAWINGS

The invention will be explained in greater detail using drawings. These show.

DETAILED DESCRIPTION OF PREFERRED EMBODIMENTS

Figure 1:
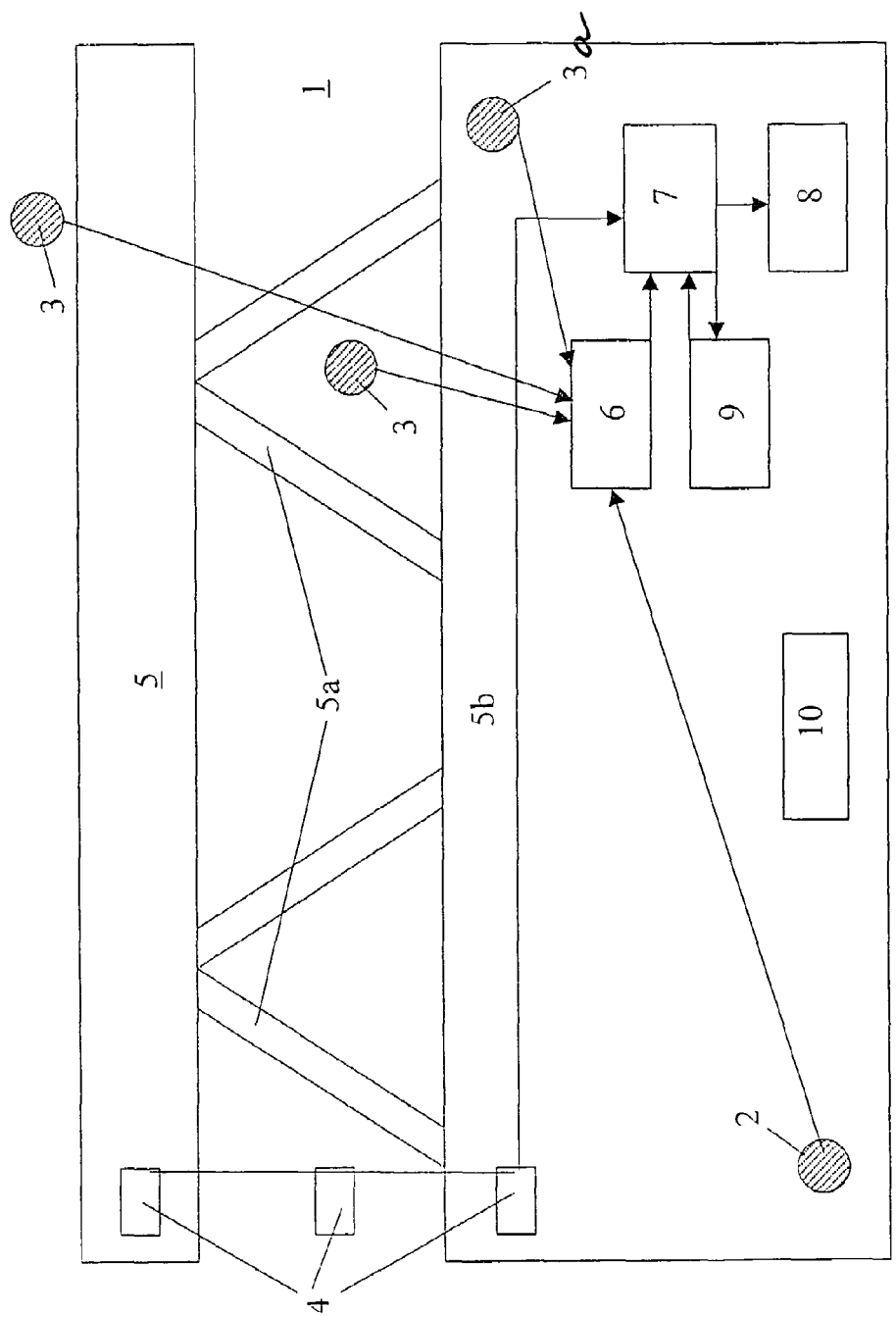
FIG. 1 an exemplary, schematic representation of an airport area with a system according to the invention for monitoring the airport, FIG. 2 an exemplary arrangement of antenna elements on two circular lines that stand perpendicular to one another, on the surface of an antenna carrier of a radar device according to the invention.

FIG. 1 shows a schematic representation of an airport area having a system according to the invention for recognizing obstructions and monitoring movements on and above an airport area. A system component 2 for simultaneous monitoring of the ground region and air region is present on the airport area 1. To avoid shadows due to larger buildings, e.g. the tower (not shown), other system components 3 that work according to the ROSAR principle are present. For example, a radar device has a plurality of antenna elements which are affixed to a curved surface of an antenna on a horizontal circular line. Furthermore, additional imaging sensors 4, for example optical sensors, are present in the region of the take-off and landing strip 5 and of the taxiing area and the apron 5a, 5b. A ROSAR radar device is device 3a.

The data of the system components 2, 3 that function according to the ROSAR principle are passed to a first data processing unit 6 that uses iconic image processing. From there, the data, reduced by means of the ROSAR processing process, are passed to a second data processing unit 7 that uses symbolic image processing. This second data processing unit 7 is also provided with data from the imaging sensors 4. Suitable processing of the data results in an image of the current situation on the airport area 1 and in the air space above the airport area 1. These data are passed to a display 8 and made visible. Furthermore, the data can also be passed to a communications unit 9 that stands in radio contact with other traffic participants 10 who are capable of cooperation. Additional data from additional sources, e.g. from pilot voice radio, are passed to the symbolic image processing process, by way of the communications unit 9.

Figure 2:
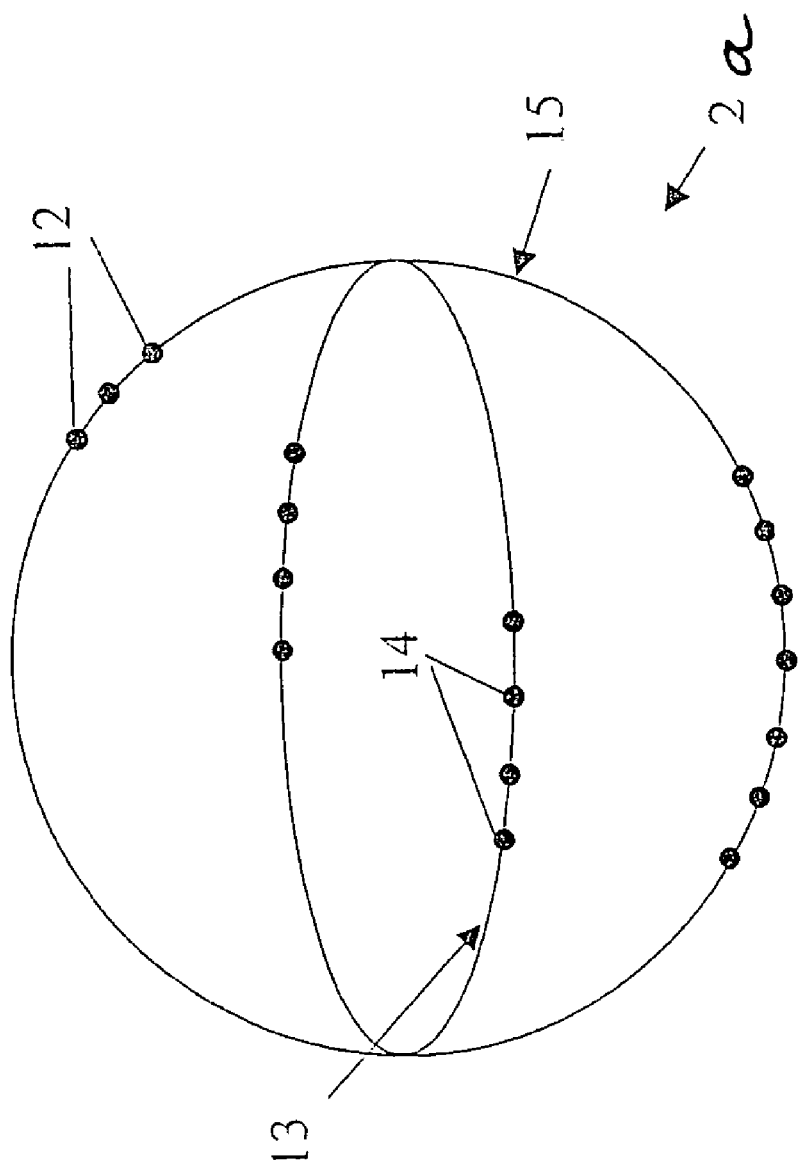

FIG. 2 shows an arrangement, as an example, of antenna elements on two circular rings 13, 15 that stand perpendicular to one another, on the surface of an antenna carrier 2a of a radar device according to the invention. The exemplary antenna carrier 2a is a sphere. Of course, the antenna carrier 2a can assume any desired shape that has rotation symmetry about at least two axes. In this connection, the antenna of the radar device can be configured as a dipole or as a horn antenna. Antenna elements 12, 14 are disposed on circular lines 13, 15 on the surface of the antenna carrier 2a, which can be spherical, for example, forming a plane, in each instance. In this connection, the two planes formed by the circular lines 13, 15 stand perpendicular to one another. Preferably, the antenna elements 12, 14 are at equal distances from one another.

The invention is claimed is:

1. System for recognizing obstructions and monitoring movements on or above an airport area with a sensor of a first type, a sensor of a second type, and a sensor of a third type,
wherein the sensor of the first type is a radar device having a plurality of antenna elements which are affixed to a curved surface of an antenna carrier and are turned on, one after the other, in terms of time, whereby a first part of the antenna elements is disposed on a first circular line on the surface of the antenna carrier and a second part of the antenna elements is disposed on a circular line perpendicular to the first circular line and whereby the data of the radar device are evaluated in a first ROSAR process, to image the situation on the ground, and in a second ROSAR process, to image the heights of the flying objects to be observed.

2. System according to claim 1,
wherein another component of the system is the sensor of the third type comprising an imaging sensor.

3. System according to claim 1,
wherein another component of the system is a ROSAR radar device, which produces a synthetic aperture by means of rotation of the antenna.

4. System according to claim 1,
wherein another component of the system is the sensor of the second type, comprising a radar device having a plurality of antenna elements, which are affixed to a curved surface of an antenna, on a horizontal circular line, and are turned on one after the other, in terms of time, whereby the data of the sensor of the second type are evaluated according to a ROSAR principle.

5. System according to claim 1,
wherein a first data processing unit that uses iconic imaging processing is present, to which the data of the sensor of the first type and of the sensor of the second type, evaluated according to the ROSAR principle, are passed.

6. System according to claim 5,
wherein a second data processing unit that uses symbolic image processing is present, to which data of the first data processing unit and the data of the imaging sensors are passed.

7. System according to claim 6,
wherein image data produced in the second data processing unit are made visible on a display and/or passed to a communications unit, from where they are passed on to an airport monitoring and/or other communications participants.

8. System according to claim 1,
wherein a position determination of the system components takes place by way of the Global Positioning System.

9. System according to claim 5,
wherein a mobile communications network on the basis of GSM is present for the transmission of data.

10. System according to claim 5,
wherein data are passed to the data processing unit by a communications unit.

11. System according to claim 2,
wherein said imaging sensors are in the infrared and visible wavelength range.

12. System according to claim 8,
wherein the Global Positioning System is a differential GPS.

13. System according to claim 10,
wherein data from pilot radio are passed to the data processing unit by the communications unit.

* * * * *